(12) United States Patent
Birman et al.

(10) Patent No.: US 8,016,441 B2
(45) Date of Patent: Sep. 13, 2011

(54) ONE LED ILLUMINATED CLUSTER

(75) Inventors: Vyacheslav B. Birman, Auburn Hills, MI (US); Christian Tanguy, Rochester, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 314 days.

(21) Appl. No.: 12/144,997

(22) Filed: Jun. 24, 2008

(65) Prior Publication Data

US 2009/0316382 A1 Dec. 24, 2009

(51) Int. Cl.
*G01D 11/28* (2006.01)

(52) U.S. Cl. ............ 362/26; 362/30; 362/551; 362/559

(58) Field of Classification Search .......... 362/628, 362/23–30, 555, 471, 489, 559, 551, 560; 116/250–251, 310, 285–288; 385/146
See application file for complete search history.

(56) References Cited

U.S. PATENT DOCUMENTS

| | | | |
|---|---|---|---|
| 4,576,436 A | | 3/1986 | Daniel |
| 5,711,588 A | * | 1/1998 | Rudisill ................ 362/30 |
| 5,961,197 A | * | 10/1999 | Watai et al. .............. 362/628 |
| 6,139,176 A | * | 10/2000 | Hulse et al. .............. 362/581 |
| 6,356,394 B1 | * | 3/2002 | Glienicke ................ 359/641 |
| 6,910,783 B2 | * | 6/2005 | Mezei et al. .............. 362/615 |
| 6,959,995 B2 | * | 11/2005 | Ikarashi et al. ............ 362/23 |
| 2004/0066659 A1 | | 4/2004 | Mezei et al. |
| 2006/0291183 A1 | | 12/2006 | Nishiyama et al. |
| 2008/0285256 A1 | * | 11/2008 | Mezouari et al. .......... 362/23 |

FOREIGN PATENT DOCUMENTS

| | | |
|---|---|---|
| DE | 10258176 | 7/2004 |
| EP | 1050711 | 11/2000 |
| GB | 482595 | 3/1938 |

OTHER PUBLICATIONS

International Search Report and Written Opinion for PCT/US2009/048217 mailed on May 7, 2010.
International Preliminary Report on Patentability mailed on Jan. 13, 2011 for PCT Application No. PCT/US2009/048217.

* cited by examiner

*Primary Examiner* — Jong-Suk (James) Lee
*Assistant Examiner* — Robert J May

(57) ABSTRACT

An illuminated instrument cluster utilizes a single light emitting diode to backlight the entire dial surface. The LED is aligned with a light guide then directs light into a cavity of a light housing. The cavity includes a surface that reflects light upwardly onto a back surface of the dial face to provide the desired illumination.

21 Claims, 3 Drawing Sheets

ONE LED ILLUMINATED CLUSTER

BACKGROUND OF THE INVENTION

This disclosure generally relates to illumination of an instrument cluster. More particularly, this disclosure relates to an instrument cluster illuminated by a single light source.

A gauge or instrument cluster for a motor vehicle typically includes a dial with markings indicative of a monitored parameter. A pointer is supported and rotated relative to the dial to provide an indication of the current parameter value. Illumination of the dial is used to both provide a desired aesthetic appearance and to allow viewing in low light conditions. Illumination is accomplished with light sources either disposed above the dial to direct light onto the dial, or from a below the dial to reflect light upward into the dial. Several light sources are utilized to provide the desired uniform light intensity about the entire dial face.

SUMMARY OF THE INVENTION

A disclosed example illuminated instrument cluster utilizes a single light emitting diode to backlight the entire dial surface. The LED is aligned with an opening in a light housing and emits light into a light guide. The light guide directs light into a cavity of the light housing that reflects light upwardly onto a back surface of the dial face to provide the desired illumination.

The light housing cavity includes a shape that corresponds with that portion of the dial face that is desired to be illuminated. The curvature of the cavity surface corresponds with the size and shape of the dial face. The example light guide includes a center portion with light reflecting surfaces that divides light into each of the first and second wings. The wings extend radially outward from the center portion to direct light into the light housing cavity in a substantially uniform manner.

These and other features of the present invention can be best understood from the following specification and drawings, the following of which is a brief description.

DETAILED DESCRIPTION OF THE PREFERRED EMBODIMENT

Figure 1:
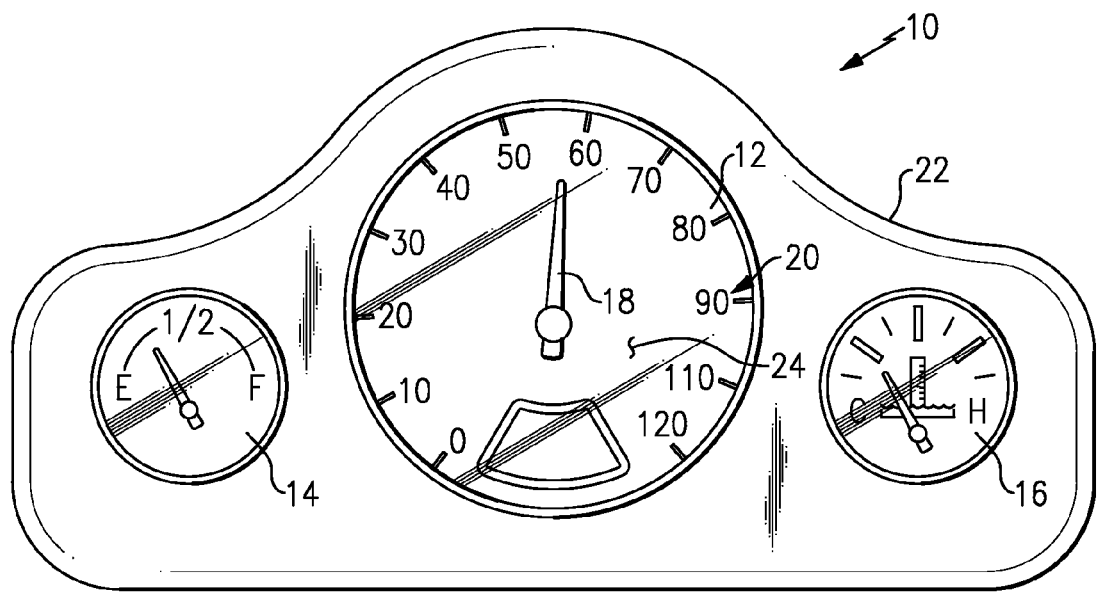
FIG. 1 is a front view of an example instrument panel.

Referring to FIG. 1, an example instrument panel assembly 10 includes dial assemblies 12, 14 and 16. The dial assembly 12 includes pointer 18 that rotates relative to a dial face 24. The dial face 24 includes markings that are indicative of a measured vehicle operating parameter. The example dial assembly 12 provides information indicative of vehicle speed and includes transparent portions 20 that are selectively illuminatable. The dial assembly 14 provides an indication of a fuel level, and the dial assembly provides a measure of engine coolant temperature. The example dial assembly 12 is utilized to describe the features of the disclosed example, however, each of the dial assemblies can be illuminated as disclosed and described.

Figure 2:
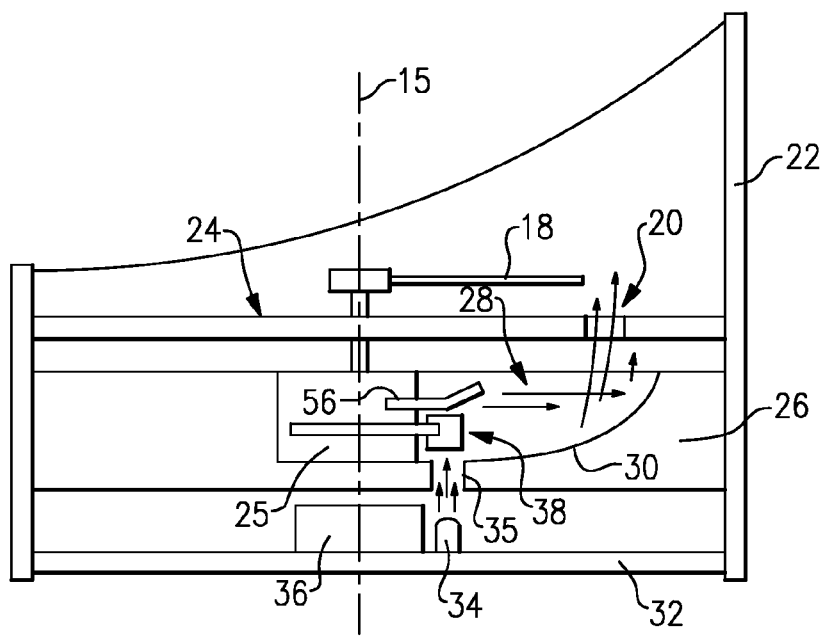
FIG. 2 is a side view of an example illuminated instrument cluster.

Referring to FIG. 2, the dial face 24 is illuminatable by a single light source 34. The example light source 34 is a light emitting diode LED. As appreciated other light sources as are known are within the contemplation of this invention. The LED 34 is mounted to a printed circuit board 32 that is mounted below a light housing 26. The circuit board 32 may also include a motor 36 for rotating the pointer 18. The LED 34 is aligned with an opening 35 in the light housing 26. Light from the LED 34 is emitted upwardly into a light guide 38. The light guide 38 directs light into a cavity 28 of the light housing. The cavity 28 includes a surface 30 that reflects light upwardly onto a back surface of the dial face 24.

The dial face 24 includes illuminatable portions 20 that are semi-transparent to provide the desired illuminated appearance. The light housing 26 reflects light emitted from the light guide 38 to illuminate the entire dial face 24 with the one LED 34.

Figure 3:
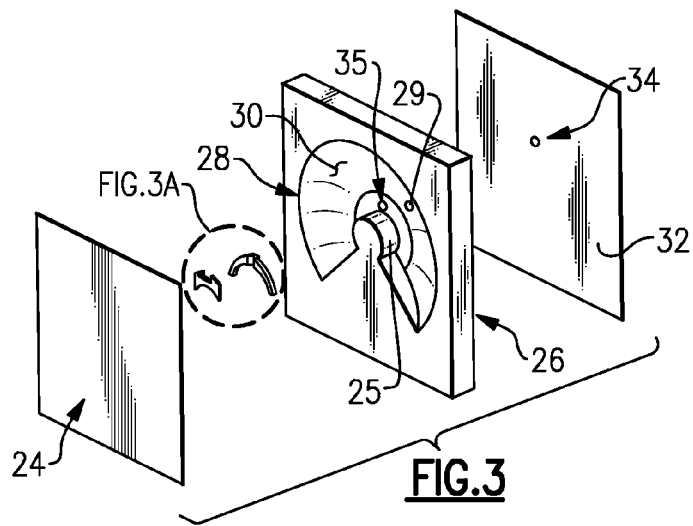
FIG. 3 is an exploded view of a portion of the example illuminated instrument cluster.
Figure 3A:
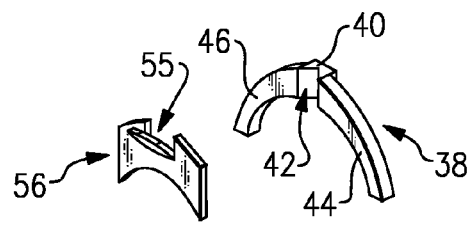
Figure 4:
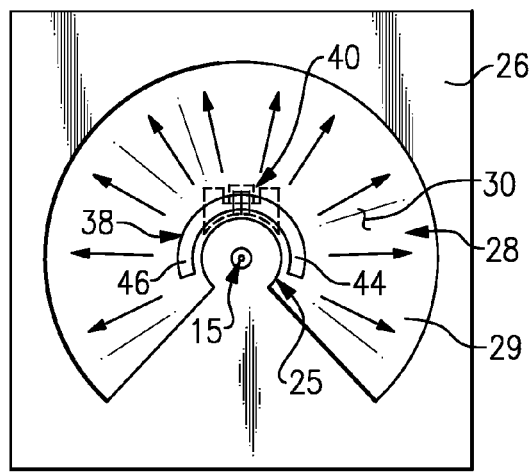
FIG. 4 is a front view of an example light housing and light guide.

Referring to FIGS. 3 and 4 with continued reference to FIG. 2, the light housing 26 includes the cavity 28 with a curved surface 30. The curved surface 30 reflects light emitted from the light guide 38 upward to the dial face 24. The light guide 38 is secured to the light housing 26 and includes a center portion 40 with reflective surfaces 42. Light from the LED 34 is emitted upwardly into the center portion 40 of the light guide 38. The reflective surfaces 42 direct the light transversely into first and second wings 44, 46. The wings 44, 46 extend radially from the center portion 40 and disperse light outward radially into the cavity 28.

The example light housing 26 is fabricated from a white plastic material that provides for the reflection of light. A reflective coating could also be applied if desired to aid in reflecting light. Further, the curvature of the curved surface 30 provides a desired reflective direction to provide illumination of the dial face 24. The example cavity 28 is disposed about axis 15 about which the pointer 18 rotates. The cavity 28 does not extend through the axis 15 but instead surrounds a central hub portion 25 through which the axis 15 extends. A shaft of the motor 36 extends upward through the central hub 25 to provide for rotation of the pointer 18.

The cavity 28 includes a shape that corresponds with that portion of the dial face 24 that is desired to be illuminated. The curvature of the curved surface 30 is determined to correspond with the size and shape of the dial face 24. A different size dial face 25 would include a correspondingly sized cavity with a corresponding curvature. The example cavity 28 extends radially only partially about the axis 15. A lower portion of the light housing 26 does not include the cavity 28 or any corresponding portion of the light guide 38.

Referring to FIG. 1 with continued reference to FIGS. 3 and 4, the dial assemblies 14 and 16 are smaller than the center dial assembly 12. The different sized dial assemblies include a correspondingly sized light housing 26. In other words, the light housing 26 corresponds with the size of the dial assembly and is therefore smaller for the dial assemblies 14 and 16. However, the light guide 38 mounted within each of the differently sized light housings can be of an identical size and configuration. The use of identically configured light guide 26 for different sized light housings provides desirable manufacturing efficiencies.

Figure 5:
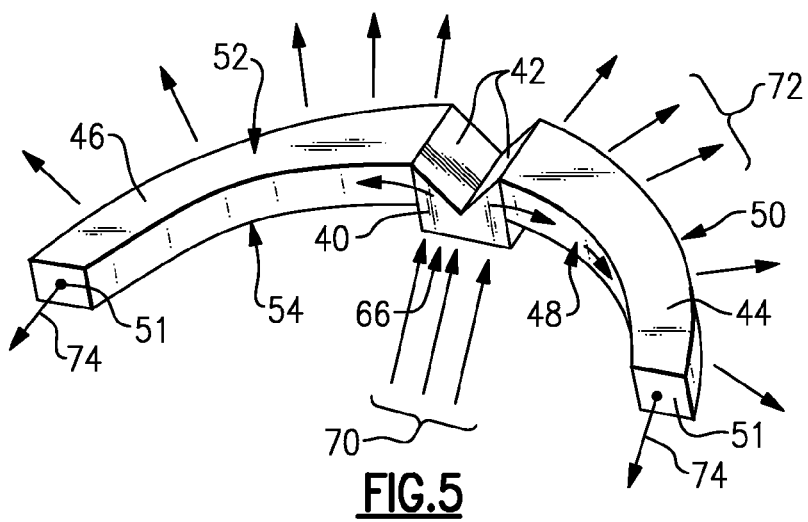
FIG. 5 is a perspective view of the example light guide.
Figure 6:
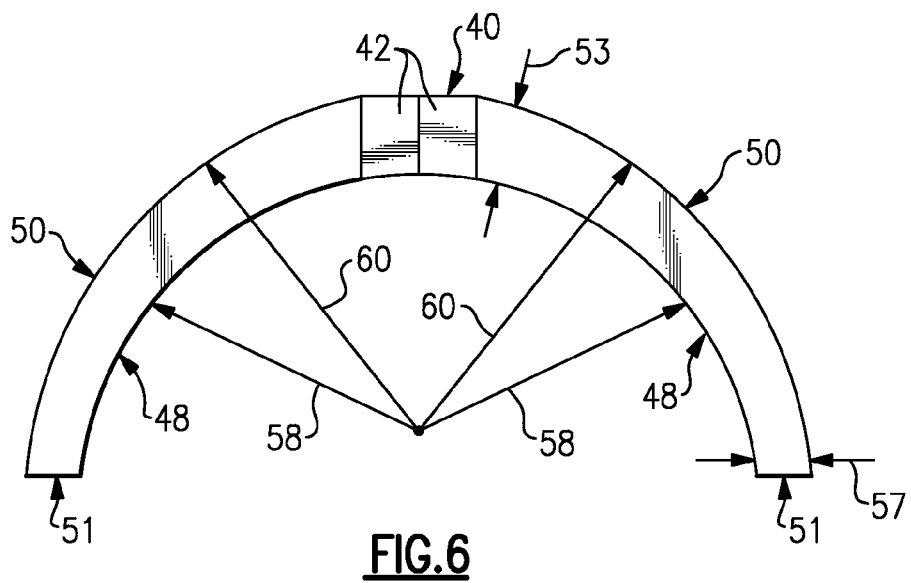
FIG. 6 is a front view of the example light guide.

Referring to FIGS. 5 and 6, with continued reference to FIGS. 2 and 3, the wings 44, 46 of the light guide 38 extend radially from the center portion a radial distance corresponding to the cavity 28. Light is transmitted from the light guide 38 into the cavity 28 for further reflection upward to the back surface of the dial face 24.

A reflector 56 is disposed over the center portion 40 of the light guide 38 to dampen the brightness of visible light emitted by the reflective surfaces 42. The reflector 56 includes a flap 55 angled upward to reflect light outwardly from the light guide 38. The reflector 56 comprises a flat member provided with a reflective coating, or fabricated from a material having desired reflective properties.

Referring to FIGS. 5 and 6, the example light guide 38 includes the center portion 40 and light reflecting surfaces 42. Light enters the light guide through a bottom surface 66 and is reflected internally by the corresponding reflecting surfaces 42. The reflecting surfaces 42 divide light into each of the first and second wings 44, 46. The wings 44, 46 extend radially outward from the center portion 40 in a radius that corresponds with the radius of the cavity 28 of the light housing 26.

Each of the wings 44, 46 include an outer surface 50 and an inner surface 48. The outer surface 50 is curved at a first radius 60 and the inner surface is curved at a second radius 58 that is less than the first radius 60. The difference between the first radius 60 and the second radius 58 provides for emission of a greater portion of light from the outer surface 50, than from the inner surface 48. The different radii of the inner and outer surfaces 48,50 provides a taper in width that decreases from a greatest width 53 adjacent the central portion 40, to smallest width 57 adjacent the end face 51 of each wing. Each of the wings 44, 46 include a top surface 52 that is substantially parallel to a bottom surface 54. The difference in the first and second radii 60, 58 provides the desired emission of light as schematically indicated by arrows 72.

Light emitted from the LED 34 enters through the surface 66 as indicated by arrows 70. The light is reflected and divided into each of the wings 44, 46. Light reflects within and is directed through each wing 44, 46 and is ultimately emitted from the outer surface 50 as indicated by arrows 72. A portion of light indicated at 74 is also emitted from each end surface 51. The emitted light 72 is then reflected upwardly onto the back face of the dial face 24 to illuminate the illuminatable portions 24 (FIG. 2).

Figure 7:
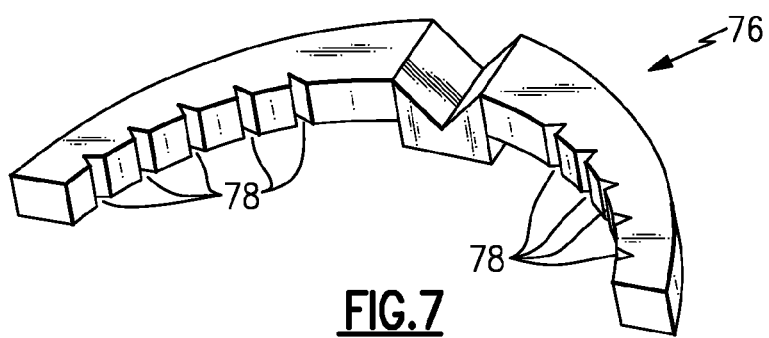
FIG. 7 is a perspective view of another example light guide.

Referring to FIG. 7, another example light guide 76 includes the addition of notches 78 that provide further reflection of light to direct the light outward into the light housing. The example light guide 76 includes V-shaped notches equally spaced radially from the center portion 40. The V-shaped notches 78 provide additional control of the direction that light is emitted. In the illustrated example the notches 78 are configured to improve illumination in area above the light guide. Different numbers and shapes of notches are within the contemplation of this invention to adapt illumination to application specific parameters.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A dial gauge assembly comprising:
   a dial face;
   a light guide disposed below the dial face, the light guide including a center portion directing light into first and second wings extending outward on opposite sides of the center portion, the first and second wings include an inner surface having a first radius and an outer surface having a second radius different than the first radius, wherein a width of each of the first and second wings defined between the inner surface and the outer surface decreases in a direction away from the center portion; and
   a single light source disposed below the light guide for directing light to the center portion.

2. The assembly as recited in claim 1, wherein the inner surface and the outer surface are substantially flat and parallel to each other.

3. The assembly as recited in claim 1, wherein the second radius is greater than the first radius.

4. The assembly as recited in claim 1, wherein one of the inner surface and the outer surface includes at least one notch for dispersing light emitted from the light guide.

5. The assembly as recited in claim 1, wherein the first and second wings include top and bottom parallel surfaces.

6. The assembly as recited in claim 1, including a reflector disposed over the center portion of the light guide for directing light transverse to the direction of incoming light.

7. The assembly as recited in claim 1, including a light housing including a cavity within which the light guide is mounted.

8. The assembly as recited in claim 7, wherein the cavity includes a curved surface for reflecting light emitted from the light guide.

9. The assembly as recited in claim 8, wherein the dial gauge assembly includes at least two separate dial gauges each of a different size and a different light housing for each of the two separate dial gauges, each of the different light housings include a curved surface corresponding to the size of the corresponding dial gauge, wherein identically configured light guides are mounted within each of the different light housings.

10. The assembly as recited in claim 7, wherein the cavity is disposed about a portion of a central axis of the dial gauge assembly.

11. The dial gauge assembly as recited in claim 1, wherein the width tapers from a greatest width adjacent the center portion to a smallest width at an end face of the first and second wings.

12. An illuminated instrument cluster comprising:
   a dial face including portions illuminatable from behind the dial face;
   a light housing including a cavity corresponding to the illuminatable portions of the dial face;
   a light guide mounted within the cavity of the light housing, the light guide including a center reflector and first and second wings extending outward from the center reflector, the first and second wings including an inner surface with a first radius and an outer surface with a second radius different than the first radius, wherein each of the first and second wings includes a width defined between the inner surface and the outer surface that decreases in a direction away from the center reflector; and
   a light source directing light into the center reflector, wherein light from the light source is reflective outward into the first and second wings to back light the dial face.

13. The illuminated instrument cluster as recited in claim 12, wherein the cavity of the light housing is semi-circular and includes a curved surface in cross-section.

14. The illuminated instrument cluster as recited in claim 12, wherein the inner surface and the outer surface are substantially flat and parallel to each other.

15. The illuminated instrument cluster as recited in claim 12, wherein the cavity includes a radius that is the same as the second radius of the light guide.

16. The illuminated instrument cluster as recited in claim 12, wherein the first radius on the inner surface is less than the second radius on the outer surface.

17. The illuminated instrument cluster as recited in claim 12, wherein at least one of the outer surface and the inner surface includes a plurality of notches for dispersing light into the cavity of the light housing.

18. The illuminated instrument cluster as recited in claim 12, including a reflector disposed over the center reflector for directing light into the cavity.

19. The illuminated instrument cluster as recited in claim 12, wherein the light source is mounted to a printed circuit board disposed behind the light housing.

20. The illuminated instrument cluster as recited in claim 12, including at least two separate dial gauges each of a different size and a different light housing for each of the two separate dial gauges, each of the different light housings include a curved surface corresponding to the size of the corresponding dial gauge, wherein identically configured light guides are mounted within each of the different light housings.

21. The illuminated instrument cluster as recited in claim 12, the width tapers from a greatest width adjacent the center reflector to a smallest width at an end face of the first and second wings.

\* \* \* \* \*